United States Patent Office 3,503,970
Patented Mar. 31, 1970

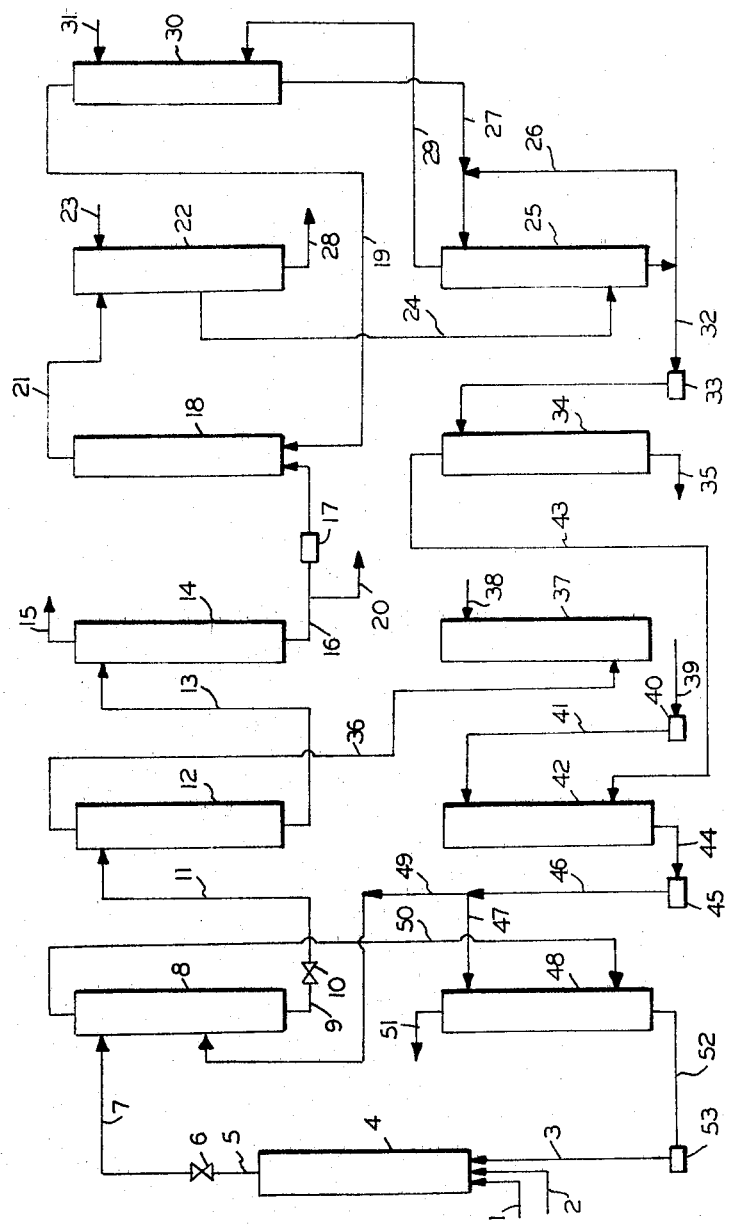

3,503,970
INTEGRATED PROCESS FOR PRODUCING UREA AND MELAMINE
Kazumichi Kanai, Fujisawa, Masatoshi Yakabe, Mobara, and Shigeru Inoue, Kamakura, Japan, assignors to Mitsui Toatsu Chemicals Incorporated, Tokyo, Japan, a corporation of Japan
Filed June 26, 1968, Ser. No. 740,115
Claims priority, application Japan, July 19, 1967, 42/46,104
Int. Cl. C07c 127/04; C07d 55/28
U.S. Cl. 260—249.7     4 Claims

ABSTRACT OF THE DISCLOSURE

An integrated process for producing urea and melamine wherein urea is produced from ammonia and carbon dioxide, melamine is produced from at least a part of the urea and a gaseous mixture of ammonia and carbon dioxide by-produced in the melamine production is utilized for the urea production without the decrease in urea synthesis ratio.

---

This invention relates to an improvement in an integrated process for producing urea and melamine by synthesizing urea from ammonia and carbon dioxide, producing melamine from at least a part of this urea and reusing the gaseous mixture of ammonia, carbon dioxide and water vapor by-produced in production of melamine for the synthesis of urea.

The most extensively used for the synthesis of urea today is a so-called solution recycle process wherein a urea synthesis effluent obtained by reacting ammonia with carbon dioxide at urea forming temperatures and pressures is subjected to a high pressure distillation and then to a low pressure distillation to separate unreacted ammonia and carbon dioxide as a gaseous mixture with water vapor and urea is obtained from the resulting aqueous solution of urea and, on the other hand, the gaseous mixture separated in the low pressure distillation is absorbed into an absorbent such as water, an aqueous solution of ammonia and an aqueous solution of urea, the resulting absorbate is compressed to a pressure of the high pressure distillation, the gaseous mixture from the high pressure distillation is absorbed into said compressed absorbate and the thus obtained recycle solution is recirculated to the synthesis of urea. Melamine is produced by the process wherein urea is heated at a comparatively low pressure, for example, below 5 kg./cm.² by gauge in the presence of ammonia and a catalyst such as silica gel, a gaseous reaction product containing melamine, ammonia and carbon dioxide is quenched with water or an aqueous solution thereby separating melamine and, at the same time, producing an aqueous solution containing by-produced ammonia and carbon dioxide as ammonium carbamate, the aqueous solution of ammonium carbamate is subjected to distillation at a pressure, for example, of 3 to 10 kg./cm.² by gauge to separate ammonium carbamate as a gaseous mixture of ammonia, carbon dioxide and water vapor, the thus obtained aqueous solution of melamine is concentrated to crystallize the melamine. It is conventional that, in this case, the separated gaseous mixture either together with the gaseous mixture of unreacted ammonia, carbon dioxide and water vapor separated from the urea synthesis effluent or as separately absorbed in an absorbent such as water, an aqueous solution of ammonia and an aqueous solution of urea is recirculated to be reused for the synthesis of urea.

However, in combining the above described urea production and melamine production, there is the following difficulty. That is to say, the pressure of the gaseous mixture of ammonia, carbon dioxide and water vapor from the melamine production is comparatively low as described above and a considerable amount of water is contained in this gaseous mixture. In the case of separating ammonium carbamate by distillation from an aqueous solution containing melamine and ammonium carbamate, it is necessary to keep the distillation temperature comparatively low in order to prevent the hydrolysis of melamine. In order to separate ammonium carbamate as a gaseous mixture of ammonia, carbon dioxide and water vapor at a low temperature, the distillation pressure must be kept low. The reduction of the distillation pressure results in the increase of the amount of water vapor in the gaseous mixture. Therefore, in case the gaseous mixture of ammonia, carbon dioxide and water vapor from the melamine synthesis is absorbed into the dilute absorbate obtained by absorbing into an absorbent the gaseous mixture from the low pressure distillation of the urea synthesis effluent, the resulting absorbate to be recirculated to the urea synthesis zone is not concentrated enough. Therefore, recirculation of this recycle solution to the synthesis of urea results in the decrease in the conversion ratio.

This difficulty is caused because the gaseous mixture from the melamine production is absorbed without further treatment in the recovering step in the conventional urea synthesis process. Therefore, in order to solve it, it is necessary that the absorbate obtained by absorbing this gaseous mixture as described above should be compressed and redistilled to separate a gaseous mixture low in the content of water vapor and should then be absorbed.

An object of the present invention is to provide an improved method of recirculating the by-produced gaseous mixture in melamine production to urea synthesis.

Another object of the present invention is to provide an integrated process for producing urea and melamine without the decrease in urea synthesis ratio.

According to the present invention, there is provided an integrated process for producing urea and melamine wherein ammonia is reacted with carbon dioxide at urea forming temperatures and pressures in a urea synthesis zone, the resulting urea synthesis effluent is expanded and passed through a high pressure distillation zone maintained at a head temperature of 90 to 130° C. and a still temperature of 130 to 170° C. under a gauge pressure of 10 to 30 kg./cm.² and then through a low pressure distillation zone maintained at a pressure lower than that of said high pressure distillation zone to separate in each stage unreacted ammonium carbamate contained in said urea synthesis effluent as a gaseous mixture of ammonia, carbon dioxide and water vapor thereby obtaining urea, at least a part of the urea is heated in the presence of ammonia and a catalyst, the resulting gaseous reaction product comprising melamine, ammonia and carbon dioxide is cooled with water or an aqueous solution to separate melamine and, at the same time, to form an aqueous solution containing the by-produced ammonia and carbon dioxide as ammonium carbamate, the aqueous solution containing ammonium carbamate is subjected to distillation at a gauge pressure of 3 to 10 kg./cm.² to separate a gaseous mixture of ammonia, carbon dioxide and water vapor, the gaseous mixture separated from said aqueous solution of ammonium carbamate and the gaseous mixtures from said low pressure distillation and said high pressure distillation are recovered and recirculated to said urea synthesis zone, characterized in that said gaseous mixture by-produced in producing melamine is absorbed at a gauge pressure of 3 to 10 kg./cm.² into the aqueous ammonium carbamate solution obtained by absorbing into an absorbent said gaseous mixture from said low pressure distillation zone to form a first absorbate, said first absorbate is compressed, a part of said first absorbate compressed is introduced into said high pressure distillation zone, to separate ammonium carbamate contained therein as a gaseous mixture of ammonia, carbon dioxide and water vapor together with unreacted ammonium carbamate contained in said urea synthesis effluent and the thus separated gaseous mixture is absorbed into the remaining part of said first absorbate to form a second absorbate for recirculation to said urea synthesis zone.

When the gaseous mixture of ammonia, carbon dioxide and water vapor by-produced in the melamine producing step is introduced without further treatment into the medium pressure absorption column to be absorbed into a dilute ammonium carbamate solution obtained by absorbing the gaseous mixture of ammonia, carbon dioxide and water vapor from the low pressure distillation in the urea producing step into an absorbent such as water, aqueous ammonia solution and an aqueous solution of urea, the resulting absorbate is not concentrated enough, because the gaseous mixture from the melamine producing step is under such comparatively low pressure as 3 to 10 kg./cm.$^2$ by gauge and a considerable amount of water is contained in this gaseous mixture. In case all the amount of this absorbate is compressed and introduced into the high pressure absorption column to absorb the gaseous mixture from the high pressure distillation, the obtained absorbate is not concentrated enough. That is to say, a capacity of absorbing ammonia and carbon dioxide is left in this absorbate. Therefore, unless a part of the absorbate from the medium pressure absorption column, that is, only an amount necessary and sufficient to absorb the gaseous mixture from the high pressure distillation is introduced as an absorbent into the high pressure absorption column, the absorbate obtained in the high pressure absorption column is not concentrated enough.

In this case, some treatment of the remaining part of the absorbate from the medium pressure absorption column is necessary. In the present invention, as described above, the absorbate compressed is introduced into the high pressure distillate column in the urea producing step and is treated together with the urea synthesis effluent so that the contained ammonium carbamate may be separated as a gaseous mixture of ammonia, carbon dioxide and water vapor together with a part of the unreacted ammonium carbamate in the urea synthesis effluent. The separated gaseous mixture of a low content of water is absorbed into a part of the absorbate from the medium pressure absorption column in the high pressure absorption column to form an aqueous ammonium carbamate solution concentrated enough and the solution is recirculated to the urea synthesis zone.

The ratio of the part of the absorbate from the medium pressure absorption column introduced into the high pressure absorption column to the part sent to the high pressure distillation column is so selected that, in case the absorbent introduced into the low pressure absorption column is water or an aqueous ammonia solution, the content of water in the absorbate obtained in the high pressure absorption column may be 15 to 25% by weight and that, in case the absorbent in the low pressure absorption column is an aqueous urea solution such as a urea mother liquor, the total amount of urea and water may be 20 to 40% by weight.

According to the present invention, in combining the urea producing step and the melamine producing step, even if ammonia and carbon dioxide by-produced in the production of melamine are received in the step of recovering unreacted ammonia and carbon dioxide in the urea production, an absorbate concentrated enough can be obtained. Therefore, even if this absorbate is recirculated to the synthesis of urea, the conversion ratio does not reduce and the conditions of the urea synthesis step need not be greatly altered.

The method of the present invention shall be concretely explained in the following with reference to the accompanying drawing. A stream 1 of liquid ammonia, stream 2 of carbon dioxide and a stream 3 of a later described recycle solution are introduced into a urea synthesis autoclave 4 and are reacted at a temperature of 160 to 220° C. and a gauge pressure of 150 to 400 kg./cm.$^2$ The mol ratio NH$_3$/CO$_2$ of the total ammonia to the total carbon dioxide in the urea synthesis autoclave 4 is made 2 to 6:1 and the liquid ammonia is preheated to 80 to 150° C. before it is introduced into the urea synthesis autoclave. A stream 5 of the resulting urea synthesis effluent is expanded to a gauge pressure of 10 to 30 kg./cm.$^2$ through a reduction valve 6. A stream 7 of the expanded urea synthesis effluent is introduced into the top part of a high pressure distillation column 8 kept at a head temperature of 90 to 130° C. and a still temperature of 130 to 170° C. and having plates or a packing zone. The unreacted ammonium carbamate is decomposed into ammonia and carbon dioxide and a gaseous mixture of ammonia, carbon dioxide and water vapor is taken out of the top of the column. As the head temperature and still temperature of the high pressure distillation column are kept at the above-mentioned values, the water content in the gaseous mixture taken out can be made lower than in the case of single distillation in case the still temperatures in both are identical.

A stream 9 of the urea synthesis effluent having the greater part of the unreacted ammonium carbamate separated in the high pressure distillation column 8 is further expanded to a gauge pressure of 0 to 3 kg./cm.$^2$ through a reduction valve 10. The expanded stream 11 is introduced into a low pressure distillation column 12. Substantially all the unreacted ammonium carbamate contained the expanded stream is distilled off as a gaseous mixture of ammonia, carbon dioxide and water vapor. The low pressure distillation column 12 may have a function of single distillation but may preferably have the same rectifying function as of the high pressure distillation column. In this case, the head temperature is kept at 80 to 130° C. and the still temperature is kept at 110 to 140° C. Further, between the high pressure distillation column and the low pressure distillation column, there may be provided a medium pressure distillation column of a pressure substantially equal to the pressure of the gaseous mixture of ammonia, carbon dioxide and water vapor by-produced in the melamine producing step. Or else, after the low pressure distillation column, in order to make the decomposition of the unreacted ammonium carbamate complete, there may be provided a gas separator of a pressure substantially equal to or lower than the pressure of the low pressure distillation column. The liquid temperature in the gas separator is kept at 100 to 130° C. Needless to say, both of the medium pressure distillation column and the gas separator may be provided together with the high pressure and low pressure distillation columns.

A stream 13 of the aqueous solution of urea discharged out of the bottom of the low pressure distillation column 12 is introduced into a concentrator 14 and is concentrated to form a urea melt. A stream 15 of water vapor containing slight amount of ammonia from the concentrator 14 may be condensed and introduced into a low pressure absorption column as described later. The concentrator 14 may be of any type. For example, a film evaporator may be used for it. By the way, instead of concentrating the solution to a substantially anhydrous melt in the concentrator 14, water produced in the urea synthesis reaction and water introduced in other steps may be removed by vacuum concentration and urea may be crystallized out. In this case, the resulting mother liquor of urea may be further concentrated and may be sent to the melamine producing step or can be used as an absorbent for the gaseous mixture separated from the urea synthesis effluent.

A stream 16 of the urea melt from the concentrator 14 is introduced into a melamine reactor 18 with a pump 17, is kept in the presence of a catalyst such as silica gel at a temperature of 150 to 500° C. and a gauge pressure of 0 to 5 kg./cm.$^2$ together with a stream 19 of ammonia introduced at the same time and is converted to melamine. A stream 20 of a part of the stream 16 of the urea melt is prilled by a known prilling method and is taken out as prilled urea or is sent to a crystallization step and is taken out as crystal urea.

A stream 21 of the gaseous product comprising melamine, ammonia, carbon dioxide and water vapor from the melamine reactor 18 is introduced into a cooling column 22, is quenched by being brought into contact with a current 23 of introduced water and is separated into an aqueous solution of ammonium carbamate in which melamine is suspended or dissolved and a gaseous mixture of ammonia, carbon dioxide and water vapor. A stream 24 of the gaseous mixture from the cooling column 22 is introduced into a washing column 25 and is condensed by being brought into contact with a stream 26 of the cooled and circulated aqueous solution of ammonium carbamate taken out of the bottom of the column and a stream 27 of the later described aqueous ammonia solution to produce an aqueous solution of ammonium carbamate. On the other hand, a stream 28 of the aqueous solution of ammonium carbamate which has been taken out of the bottom part of the cooling column 22 and in which melamine is suspended or dissolved is separated by centrifugal separation into melamine and the mother liquor. Or the contained ammonium carbamate is separated by distillation as a gaseous mixture of ammonia, carbon dioxide and water vapor, is then concentrated and subjected to a crystallization to separate melamine.

Excess ammonia not absorbed in the washing column 25 is taken as a stream 29 out of the top of the column together with water vapor, is introduced into the bottom part of an ammonia distillation column 30, and is brought into contact with a stream 31 of the liquid ammonia fed from the top of the column to condense the contained water vapor. The resulting stream 19 of dried ammonia gas is recirculated to the melamine reactor 18. A stream 27 of an aqueous ammonia solution produced in the condensation of the above described water vapor is taken out of the bottom of the ammonia distillation column 30 and is introduced into the washing column 25 as described above. In place of a part or all of water as a coolant to be introduced into the cooling column 22, the aqueous solution from the bottom of the cooling column and the aqueous solution of ammonium carbamate from the washing column 25 may be recirculated after cooling. Further, in order to remove the water vapor in the ammonia gas from the washing column 25, the ammonia gas may be made an aqueous solution from which an ammonia gas containing no water is obtained by distillation.

The other part of the aqueous solution of ammonium carbamate taken out of the bottom of the washing column 25 than is circulated as the stream 26 to the top of the column is introduced as a stream 32 into an ammonium carbamate decomposing column 34 kept at a gauge pressure of 3 to 10 kg./cm.$^2$ with a pump 33 and is treated together wtih the simultaneously introduced mother liquor remaining after melamine is separated from the aqueous solution containing ammonium carbamate and melamine in a suspension form and taken out of the cooling column 22 to separate the ammonium carbamate contained therein as a gaseous mixture of ammonia, carbon dioxide and water vapor. In this case, as the melamine contained in the mother liquor is contained in a stream 35 of the drain from the bottom of the column, the drain is concentrated to separate melamine as crystals from the concentrated solution. By the way, the treatment of the motor liquor remaining after the melamine is separated from the stream 28 is not limited only to this method but, for example, the mother liquor may be cooled and recirculated as a coolant to the cooling column 22.

A stream 36 of the gaseous mixture separated from the urea synthesis effluent in the low pressure distillation column 12 is introduced into a low pressure absorption column 37 and is absorbed at a gauge pressure of 0 to 3 kg./cm.$^2$ into a simultaneously introduced stream 38 of an absorbent. For the absorbent to be introduced into the low pressure absorption column is used water, the afore-mentioned condensed water containing slight amount of ammonia from the concentrator 14 or the urea mother liquor in case urea crystals are obtained by crystallization. The bottom part of the low pressure adsorption column is cooled with water and kept at a temperature of 40 to 60° C. In the case that the gas separator is provided after the low pressure distillation column, the gaseous mixture of ammonia, carbon dioxide and water vapor from this separator is absorbed at a temperature of 40 to 60° C. into the above-mentioned absorbent and the resulting absorbate is introduced as an absorbent into the low pressure absorption column.

A stream 39 of the absorbate from the low pressure absorption column 37 is compressed to a gauge pressure of 3 to 10 kg./cm.$^2$ with a pump 40 and the compressed stream 41 is introduced into a medium pressure absorption column 42. At the same time, a stream 43 of the gaseous mixture of ammonia, carbon dioxide and water vapor separated in the ammonium carbamate decomposing column 34 is introduced into the medium pressure absorption column 42 and absorbed into the stream 41.

As described above, in the case that the medium pressure distillation column is used next the high pressure distillation column, the gaseous mixture of ammonia, carbon dioxide and water vapor from the medium pressure distillation column is introduced into the medium pressure absorption column 42 and absorbed into the stream 41 together with the stream 43. The bottom part of the medium pressure absorption column is cooled with water and kept at 40 to 70° C.

A stream 44 of the absorbate from the medium pressure absorption column 42 is compressed to a gauge pressure of 10 to 30 kg./cm.$^2$ with a pump 45. A stream 47 of a part of the compressed stream 46 is introduced into a high pressure absorption column 48 and a stream 49 of the remaining part of the stream 46 is introduced into the middle part of the high pressure distillation column 8. The ratio of the stream 47 to the stream 49 is different depending on the amount of the stream 46 and the concentration of ammonium carbamate therein but is so selected that, in case the absorbent is water or an aqueous ammonia solution, the content of water in the absorbate obtained in the high pressure absorption column may be 15 to 25% by weight and that, in case the absorbent is an aqueous solution of urea, the total amount of urea and water may be 20 to 40% by weight. Further, the place of feeding the stream 49 to the high pressure distillation column 8 is selected depending on the composition of the stream 49 and the liquid composition on the plates or in the packing zone of the high pressure distillation column. The stream 49 introduced into the high pressure distillation column 8 is subjected to distillation together with the stream 7 and the ammonium carbamate contained therein is separated as a gaseous mixture of ammonia, carbon dioxide and water vapor. A stream 50 of the gaseous mixture of ammonia, carbon dioxide and water vapor from the high pressure distillation column 8 is introduced into the high pressure absorption column 48 and substantially all of the carbon dioxide and a part of the ammonia contained therein are absorbed into the stream 47. In this case, the stream 47 is introduced as mixed with liquid ammonia to utilize the heat of evaporation of this liquid ammonia for removing the heat of absorption generated. The heat is also removed by passing through a cooling pipe provided in the bottom of the column. The aqueous solution of urea may be taken out of the concentrator and passed through this cooling pipe to utilize the heat of absorption as the heat source for concentrating the aqueous solution of urea. By adopting such means, the bottom temperature of the high pressure absorption column 48 is maintained at a temperature of 80 to 140° C. The ammonia mixed in the stream 46 and evaporated in the high pressure absorption column 48 and the unabsorbed ammonia in the stream 50 of the gaseous mixture are taken out of the top of the column as a stream 51, are washed with an aqueous ammonia solution to remove the small amount of carbon dioxide contained therein and are then cooled and condensed to form liquid ammonia. The amount of the liquid ammonia corresponding to the amount mixed into the stream 47 is recirculated to the high pressure absorption column and the rest is recirculated to the urea synthesis autoclave 4 together with the stream 1 of liquid ammonia. A stream 52 of the absorbate (recycle solution) taken out of the bottom of the high pressure absorption column 43 is compressed to the urea synthesis pressure with a pump 53 and the stream 3 of the compressed recycle solution is introduced into the urea synthesis autoclace 4.

An example of the present invention is shown in the following. In the example, the parts and percentages are by weight.

EXAMPLE 253.9 parts/hr. of liquid ammonia (including 153.6 parts/hr. of recovered liquid ammonia) preheated to 90° C., 148.4 parts/hr. of carbon dioxide and a recycle solution consisting of 152.1 parts/hr. of ammonia, 148.0 parts/hr. of carbon dioxide and 75.5 parts/hr. of water were introduced into a urea synthesis autoclave and were reacted at 185° C. and 215 kg./cm.$^2$ by gauge. The conversion ratio in this case was 59.7%. A urea synthesis effluent taken out of the urea synthesis autoclave and consisting of 240.5 parts/hr. of urea, 268.8 parts/hr. of ammonia, 119.9 parts/hr. of carbon dioxide and 147.6 parts/hr. of water was expanded to 20 kg./cm.$^2$ by gauge and introduced into a high pressure distillation column having seven bubble cap plates and kept at a still temperature of 160° C. and a head temperature of 120° C. At the same time, an absorbate consisting of 32.5 parts/hr. of ammonia, 16.1 parts/hr. of carbon dioxide and 25.0 parts/hr. of water from a medium pressure absorption column was introduced into the lowermost plate of the high pressure distillation column and a gaseous mixture of 265.6 parts/hr. of ammonia, 126.7 parts/hr. of carbon dioxide and 39.7 parts/hr. of water was separated. A urea synthesis effluent consisting of 238.1 parts/hr. of urea, 36.2 parts/hr. of ammonia, 11.2 parts/hr. of carbon dioxide and 132.1 parts/hr. of water from a high pressure distillation column was expanded to 1.5 kg./cm.$^2$ by gauge and was introduced into a low pressure distillation column in which a gaseous mixture consisting of 35.7 parts/hr. of ammonia, 11.4 parts/hr. of carbon dioxide and 33.0 parts/hr. of water was separated at 130° C. The resulting aqueous solution of urea of 236.5 parts/hr. of urea, 1.4 parts/hr. of ammonia, 1.0 part/hr. of carbon dioxide and 96.6 parts/hr. of water was concentrated to form a melt containing 1% of water. 63.9 parts/hr. of the melt were sent to a melamine producing step and the remaining part was prilled by a conventional method to form granular urea.

63.9 parts/hr. of the urea melt from the urea producing step were introduced together with 120 parts/hr. of ammonia gas into a melamine reactor and heated in contact with silica gel at 400° C. and 0.5 kg./cm.$^2$ by gauge to form melamine.

A gaseous reaction product consisting of 20 parts/hr. of melamine, 140.1 parts/hr. of ammonia and 26 parts/hr. of carbon dioxide from the melamine reactor was introduced into a cooling column and was quenched to 90° C. by being brought into contact with a recycle solution from a washing column, thereby dissolving melamine into an aqueous solution of ammonium carbamate. The gaseous mixture of the unabsorbed ammonia and carbon dioxide was introduced into the washing column to completely absorb the carbon dioxide into an aqueous ammonia solution from the ammonia distillation column thereby forming an aqueous solution of ammonium carbamate. The aqueous solution of ammonium carbamate was circulated to the above described cooling column.

Excess ammonia from the washing column was introduced into the lower part of the ammonia distillation column and was distilled while introducing 14.9 parts/hr. of liquid ammonia from the column top to obtain 120 parts/hr. of anhydrous ammonia gas. The ammonia gas was recirculated to the melamine reactor and the aqueous ammonia solution from the bottom of the column was introduced into the washing column.

The aqueous solution of ammonium carbamate obtained in the cooling column was compressed to 6 kg./cm.$^2$ by gauge and was introduced into a ammonium carbamate decomposing column in which the ammonium carbamate was decomposed at 160° C. A gaseous mixture consisting of 35 parts/hr. of ammonia, 26 parts/hr. of carbon dioxide and 16 parts/hr. of water was separated from the top of the column top and was returned to the urea producing step and the aqueous solution of melamine from which ammonium carbamate had been removed was concentrated to obtain 20 parts/hr. of crystal melamine.

A gaseous mixture distilled in the low pressure distillation in the urea producing step was introduced into a low pressure absorption column and was absorbed into water to form an absorbate consisting of 35.7 parts/hr. of ammonia, 11.4 parts/hr. of carbon dioxide and 42 parts/hr. of water. The temperature of the bottom part of the low pressure absorption column was kept at 45° C. by water cooling. This absorbate was compressed to introduce into a medium pressure absorption column and was brought into contact at 5.5 kg./cm.$^2$ by gauge with a simultaneously introduced gaseous mixture from the melamine producing step thereby absorbing the gaseous mixture and forming an absorbate consisting of 70.7 parts/hr. of ammonia, 37.4 parts/hr. of carbon dioxide and 58 parts/hr. of water. The bottom temperature of the medium pressure absorption column was kept at 50° C. The absorbate from the medium pressure absorption column was compressed to 20 kg./cm.$^2$ by gauge and was divided into two portions. 71.7 parts/hr. of the absorbate were preheated to 130° C., and were then introduced into the lowermost plate of the high pressure distillation column as described above. The remaining 94.4 parts/hr. of the absorbate were mixed with 93.4 parts/hr. of liquid ammonia. The resulting mixture was introduced into the high pressure absorption column and was brought into contact at 19 kg./cm.$^2$ by gauge with the simultaneously introduced gaseous mixture from the high pressure distillation column to absorb it. In this case, the added liquid ammonia was vaporized. The heat of vaporization and water-cooling in the bottom part of the column removed the heat of absorption of the gaseous mixture and the temperature of the bottom part of the column was kept at 105° C. The vaporized ammonia gas and the unabsorbed ammonia gas in the gaseous mixture were washed with an aqueous solution of ammonia consisting of 18.5 parts/hr. of ammonia and 2.8 parts/hr. of water in the upper part of the high pressure absorption column to remove the contained small amount of carbon dioxide and was then cooled and condensed to form liquid ammonia. 153.6 parts/hr. of the liquid ammonia were introduced together with 100.3 parts/hr. of new raw material liquid ammonia into the urea synthesis autoclave and the rest was introduced as liquid ammonia and an aqueous ammonia solution into the high pressure absorption column as described above. The absorbate taken out of the bottom part of the high pressure absorption column and consisting of 152.1 parts/hr. of ammonia, 148.0 parts/hr. of carbon dioxide and 75.5 parts/hr. of water was compressed to 215 kg./cm.$^2$ by gauge and introduced into the urea synthesis autoclave.

What is claimed is:

1. In an integrated process for producing urea and melamine wherein ammonia is reacted with carbon dioxide at urea forming temperatures and pressures in a urea synthesis zone, the resulting urea synthesis effluent is expanded and passed through a high pressure distillation zone kept at a head temperature of 90 to 130° C. and a still temperature of 130 to 170° C. under a gauge pressure of 10 to 30 kg./cm.$^2$ and then through a low pressure distillation zone kept at a pressure lower than that of said high pressure distillation zone to separate in each stage unreacted ammonium carbamate as a gaseous mixture of ammonia, carbon dioxide and water vapor thereby obtaining urea, at least a part of the urea is heated in the presence of ammonia and a catalyst, the resulting gaseous reaction product comprising melamine, ammonia and carbon dioxide is cooled with a coolant selected from the group consisting of water and an aqueous solution to separate melamine and, at the same time, to form an aqueous solution containing by-produced ammonia and carbon dioxide as ammonium carbamate, the aqueous solution of ammonium carbamate is subjected to distillation at a gauge pressure of 3 to 10 kg./cm.$^2$ to separate a gaseous mixture of ammonia, carbon dioxide and water vapor, the gaseous mixture separated from said aqueous solution of ammonium carbamate and the gaseous mixtures separated by said low pressure distillation and said high pressure distillation from said urea synthesis effluent are recovered and recirculated to said urea synthesis zone, the improvement which comprises absorbing at a gauge pressure of 3 to 10 kg./cm.$^2$ said gaseous mixture by-produced in producing melamine into the ammonium carbamate solution obtained by absorbing into an absorbent said gaseous mixture separated in the low pressure distillation zone to form a first absorbate, increasing the pressure of said first absorbate, introducing a part of said first absorbate having the pressure increased into said high pressure distillation zone to separate ammonium carbamate contained therein as a gaseous mixture of ammonia, carbon dioxide and water vapor together with unreacted ammonium carbamate contained in said urea synthesis effluent and absorbing the thus separated gaseous mixture into the remaining part of said first absorbate to form a second absorbate for recirculation to said urea synthesis zone.

2. A process as claimed in claim 1 wherein said absorbent is a member selected from the group consisting of water, an aqueous ammonia solution and an aqueous urea solution.

3. A process as claimed in claim 1 wherein said absorbent is a member selected from the group consisting of water and an aqueous ammonia solution and wherein the water content of said second absorbate is 15 to 25 weight percent of said second absorbate.

4. A process as claimed in claim 1 wherein said absorbent is an aqueous urea solution and wherein the total amount of water and urea in said second absorbate is 20 to 40 weight percent of said second absorbate.

References Cited

UNITED STATES PATENTS 3,310,558   3/1967   Oele et al. _____ 260—249.7

HENRY R. JILES, Primary Examiner

JOHN M. FORD, Assistant Examiner

U.S. Cl. X.R.

260—555